Patented July 6, 1943

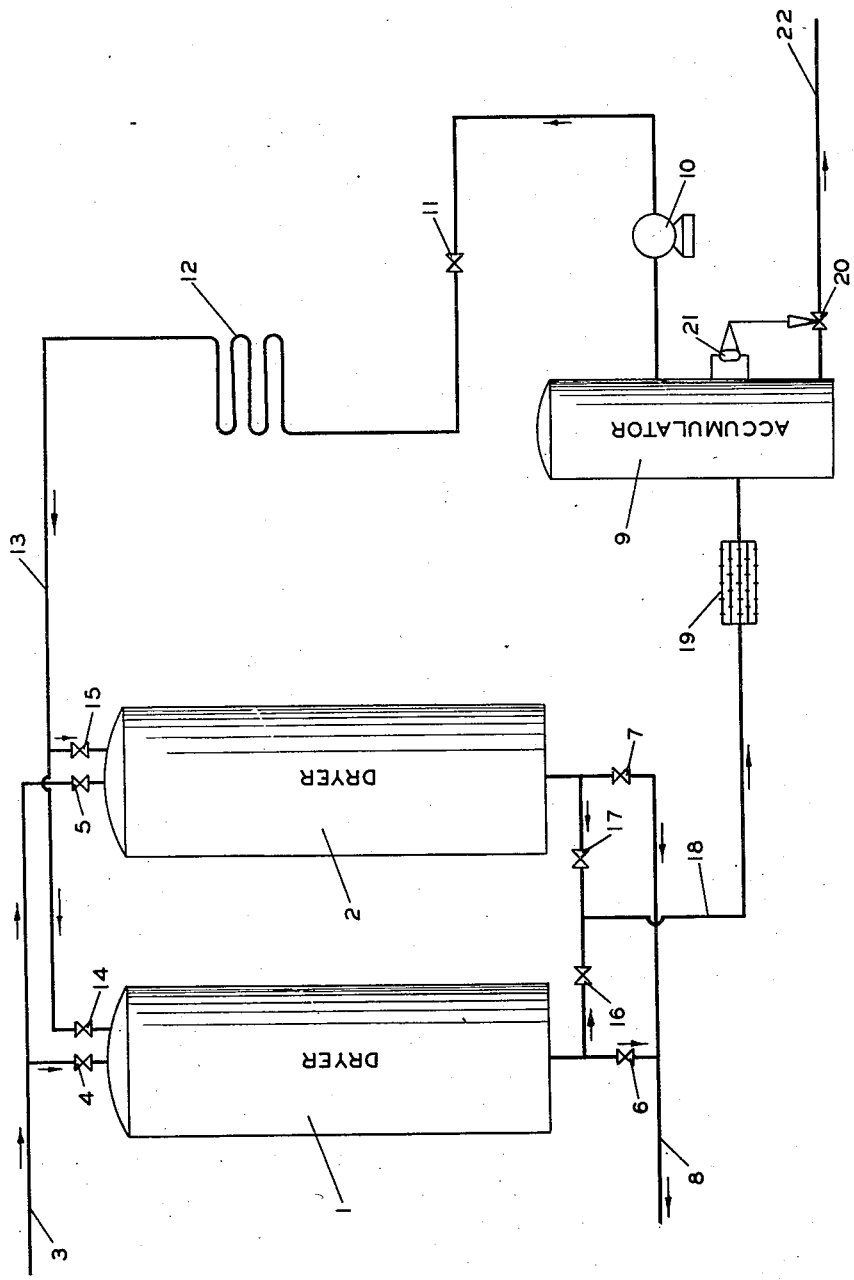

2,323,524

UNITED STATES PATENT OFFICE 2,323,524

DRYING PROCESS

George F. Downs, Jr., Bartlesville, Okla., assignor to Phillips Petroleum Company, a corporation of Delaware Application February 24, 1941, Serial No. 380,384

2 Claims. (Cl. 34—37)

This invention relates to a method of dehydrating fluids. More particularly, it relates to the regeneration of desiccant materials used in drying operations.

In accordance with present practice, solid desiccant materials which have become inactive due to absorption of water are regenerated by heating the desiccant with hot gases. The hot gases are passed through the desiccant from which they extract the water as water vapor. The exit gas containing the water vapor from the desiccant is either wasted or cooled below its dew point thereby causing part of the water vapor to condense. In the latter instance the condensate is withdrawn and the gas is passed to a compressor or circulating blower. After leaving the compressor or blower the gas is heated to a suitable regeneration temperature and again contacted with the desiccant. This cycle of operations is carried on continuously until the desired regeneration is obtained.

In accordance with the present invention, vapors from a liquid immiscible wath water are used as the drying medium for regenerating the desiccant. The heated vapors are passed through the desiccant where they mix with water vapor. The mixture of vapors leaving the drying chamber is condensed and the two immiscible liquids, water and the drying medium, separated by reason of their differences in density.

This invention has several advantages over the present methods of regenerating desiccants. For example, the drying medium is conveniently circulated by a pump or by gravity as a liquid having a relatively small volume thus obviating the necessity of handling a large volume of gas with a compressor or blower. Separation of the condensate water from the condensate drying medium results in a better separation of water from the drying medium than is obtainable by the present method under ordinary operating conditions. The low concentration of water in the hot vapor passed to the desiccant makes possible more rapid and efficient regeneration of the desiccant. If the fluid being dried by the desiccant is one of the more readily condensable hydrocarbons, most of which are only slightly miscible with water, this fluit may itself be used for regeneration of the desiccant in accordance with this invention.

An bject of this invention is to provide an improved method for the dehydration of fluids.

Another object of this invention is to provide an improved method of regenerating desiccants.

The figure is a diagrammatic elevational view of a preferred embodiment of this invention.

With reference to the drawing, the numerals 1 and 2 designate vessels containing a suitable desiccant material for removing water from the fluid to be dried. The use of two or more such vessels allows continuous operation of the drying system, one vessel containing desiccant being "on stream" while the desiccant in another is being regenerated. The fluid to be dried enters the system through the pipe 3 from which it may be directed through the valve 4 to the vessel 1 or through the valve 5 to the vessel 2 as desired. The dried effluent fluid from the vessels is withdrawn through the valves 6 and 7 and through the pipe 8 as required.

The regenerative liquid or drying medium for regenerating the desiccant is contained in the accumulator 9. From the accumulator 9, the liquid is pumped by pump 10 through the control valve 11 to a vaporizer and heater 12. The liquid is vaporized and the heated vapors from heater 12 are led through the conduit 13 to the vessel containing the spent desiccant. From the conduit 13 the heated vapors may be passed into the vessel 1 through the valve 14 or into the vessel 2 through the valve 15. These vapors, together with any vapors evolved from the desiccant, are withdrawn from the vessels through the valve 16 or 17 and the pipe 18. The vapors pass through pipe 18 to the condenser 19 in which they are cooled and condensed. Condensate from the condenser flows to the accumulator 9 where any liquid water contained in the condensate is separated from the liquid drying medium by reason of difference in density of the two immiscible liquids. The water separated out in the accumulator is withdrawn from the accumulator through the valve 20, which is operated by a differential float control 21, and is disposed of by the pipe 22.

In operation, the fluid in the pipe 3, from which water is to be removed, is passed through the valve 4 into contact with the desiccant contained in the vessel 1. It will be understood by those skilled in the art that the water content of the fluid entering the chamber is rather small and that desiccants are used only where the small water content is to be further reduced. Activated alumina, bauxite, silica jel, and specially treated bauxite have been found to be satisfactory desiccants for reducing to a very low value the concentration of water in petroleum fractions. As the fluid passes over the desiccant the water is removed from the fluid by absorption, adsorption, or chemical combination with the desiccant. The water content of the effluent fluid leaving the vessel 1 through the valve 6 and pipe 8 depends upon the nature of the desiccant used and the water content of the desiccant. After the vessel has been on stream for a considerable period of time the water content of desiccant reaches such a value that the desiccant becomes ineffective. When the desiccant is no longer effective for sufficiently reducing the water concentration of the effluent from the vessel, the flow of fluid is switched to another vessel, in this instance to vessel 2. This is accomplished by closing valves 4 and 6 and opening valves 5 and 7.

The desiccant in vessel 1 is then regenerated, in situ, in accordance with the present invention. The valves 14 and 16 are opened to allow circulation of the regenerative medium over the spent desiccant contained in the vessel. The regenerative medium from accumulator 9 is pumped by the pump 10 to the heater 12 where it is vaporized and the resulting vapors heated to the desired temperature. The control valve 11 governs the rate at which the liquid is fed to the heater, which in turn, determines the volume of vapor produced by the heater. The heated vapor flows through the pipe 13 and valve 14 into vessel 1 passing over and heating the desiccant contained therein. The heating effect and the partial pressure of the vapor causes vaporization of the water associated with the desiccant. The water vapor and the vapor of the regenerative medium flow through the pipe 18 to the condenser 19 where both are condensed. The mixture making up the condensate from the condenser passes into the accumulator 9 which acts as a gravity separator for the liquids. Circulation of the hot regenerative vapors over the desiccant in vessel 1 is continued until the water content of the desiccant is reduced and the desiccant thereby regenerated to the desired extent. The temperatures required for regeneration of the desiccant depends upon the desiccant used and are known to those skilled in the art.

Preferably, whenever possible, the regenerating medium is the same fluid as that being dried by the desiccant or one having similar properties so that the danger of contamination is minimized. This system of regeneration makes it unnecessary to have a source of inert gas available for regeneration of the desiccant. The disadvantages and hazards resulting from the use of air or an oxygen-containing gas are eliminated by the present invention. In drying hydrocarbons, for example, contamination of the hydrocarbon fluid with a gas containing oxygen and other fixed gases may lead to corrosion trouble or increased vapor pressure of the treated product due to the solution of fixed gases therein. The hydrocarbon being treated may be used as the regenerative fluid by maintaining the pressure in the regeneration system at such a value that condensation of the fluid will take place in the condenser. If the fluid being dried is gaseous, the accumulator may be charged with a quantity of regenerative medium sufficient for several regenerations.

When the regeneration of the desiccant in vessel 1 is completed, the valves 14 and 16 are closed and the desiccant is ready for use. In some instances it may be preferable to allow the desiccant to cool before putting it back on stream. The desiccant is cooled rapidly by the fluid when on stream. The vessel 1 may be held in reserve until the activity of the desiccant in the vessel 2 decreases to such an extent that the moisture content of the effluent of chamber 2 reaches the maximum allowable. During this period the control valve 11 may be closed cutting off the supply of liquid to the heater 12. The regeneration gas remaining in the system will condense upon cooling and flow back to the accumulator 9, thereby avoiding contamination of the fluid being dried, and waste of the regeneration liquid. When the desiccant in vessel 2 becomes ineffective, the vessel 1 is put back on stream by opening valves 4 and 6 and the vessel 2 is isolated by closing valves 5 and 7. The desiccant in the vessel 2 may then be regenerated by opening valves 15 and 17 and circulating regenerative fluid through the vessel as hereinbefore described in connection with vessel 1. When regenerated, the desiccant in vessel 2 may be held in reserve until that in vessel 1 becomes inactive. The cycle of operations is then repeated. While two vessels are here shown and described it will be apparent that more vessels may be used if necessary and that the cycle of operations may be made to conform with the operating characteristics of the desiccant. For example, if the time required for regeneration is one-half the allowable on stream time, a plurality of vessels may be employed of which for each vessel being regenerated, twice as many may be on stream.

I claim:

1. In the method of dehydrating hydrocarbon liquids by contact thereof with a desiccant, the steps which comprise regenerating the desiccant by heating a portion of the hydrocarbon liquid to form vapor, contacting the hydrated desiccant with said vapor to remove water therefrom, condensing the water-containing hydrocarbon vapor, separating the condensed hydrocarbon from the condensed water, and again utilizing the so treated desiccant for the dehydration of said hydrocarbon liquid.

2. A process according to claim 1 in which the desiccant is bauxite.

GEORGE F. DOWNS, Jr.